United States Patent
Clarke et al.

(10) Patent No.: US 7,090,255 B2
(45) Date of Patent: Aug. 15, 2006

(54) DISPOSABLE CLAMP LOCATOR FOR AIR CONDITIONING HOSE ASSEMBLIES

(75) Inventors: John Clarke, Spring Hill, FL (US); Jerry Arivett, Midlothian, TX (US)

(73) Assignee: ATCO Products, Inc., Ferris, TX (US)

( * ) Notice: Subject to any disclaimer, the term of this patent is extended or adjusted under 35 U.S.C. 154(b) by 0 days.

(21) Appl. No.: 10/854,441

(22) Filed: May 26, 2004

(65) Prior Publication Data

US 2005/0264002 A1   Dec. 1, 2005

(51) Int. Cl.
F16L 55/00 (2006.01)

(52) U.S. Cl. .......................... 285/23; 285/252

(58) Field of Classification Search ................ 285/257, 285/253, 252, 114, 23; 24/279, 20 R, 20 S
See application file for complete search history.

(56) References Cited

U.S. PATENT DOCUMENTS

| | | | | |
|---|---|---|---|---|
| 134,158 | A * | 12/1872 | Nutting ..................... | 285/114 |
| 541,596 | A * | 6/1895 | Curlett ..................... | 285/253 |
| 1,204,650 | A * | 11/1916 | Claflin ..................... | 285/114 |
| 1,346,330 | A * | 7/1920 | Mitchell ..................... | 285/114 |
| 1,354,669 | A * | 10/1920 | Levedahl ..................... | 285/115 |
| 1,426,086 | A * | 8/1922 | Lowrey ..................... | 285/114 |
| 1,505,255 | A * | 8/1924 | Gold ..................... | 285/114 |
| 1,599,775 | A * | 9/1926 | Lamb et al. ................. | 285/114 |
| 1,911,486 | A * | 5/1933 | Bacheldor et al. .......... | 285/114 |
| 2,184,984 | A * | 12/1939 | Stone et al. ................ | 285/253 |
| 2,250,286 | A | 7/1941 | White | |
| 3,174,777 | A * | 3/1965 | Evans et al. ................ | 285/252 |
| 3,442,537 | A | 5/1969 | Courtot et al. | |
| 3,463,517 | A * | 8/1969 | Jeromsom, Jr. et al. ...... | 285/93 |
| 3,479,713 | A | 11/1969 | Weatherhead, Jr. | |

(Continued)

FOREIGN PATENT DOCUMENTS

DE      921121   * 12/1954   ................. 285/252

(Continued)

OTHER PUBLICATIONS

ATCO Brochure dated Jun. 6, 2004; 75181 Rev. C re Model 3710 Portable Bubble Style Hose Crimper Featuring Quick Change Dies.

(Continued)

*Primary Examiner*—David Bochna
(74) *Attorney, Agent, or Firm*—Sonnenschein Nath & Rosenthal LLP; Brian R. McGinley

(57) ABSTRACT

A clamp locator for hose assemblies is provided. The clamp locator includes releasable connections for holding hose clamps during assembly of a hose to a hose fitting. The releasable connections comprise generally elastic fingers that hold the clamps to the locator. As the hose clamps are crimped and closed over the hose the clamps are pulled from the fingers and released from the locator. The locator includes a reference locating tab protruding from the body of the locator. The tab corresponds to a reference locating groove in a fitting to which the hose is to be attached. The locator, with clamps attached, is first slid over an end of the hose and the fitting is inserted into the hose end. A ramp on the fitting leads the tab to the groove in the fitting as the fitting is inserted into the hose end. The tab will snap into the groove, indicating that the hose, fitting and clamps are properly aligned. The clamps are then crimped over the hose and the locator released for proper disposal.

22 Claims, 1 Drawing Sheet

U.S. PATENT DOCUMENTS

| | | | | |
|---|---|---|---|---|
| 4,093,282 | A | * | 6/1978 | Kyriakodis .................. 285/114 |
| 4,796,925 | A | * | 1/1989 | Zwicker ..................... 285/114 |
| 4,872,711 | A | * | 10/1989 | Weinhold .................... 285/88 |
| 5,368,337 | A | * | 11/1994 | Torres ....................... 285/114 |
| 5,370,425 | A | | 12/1994 | Dougherty et al. |
| 5,417,461 | A | | 5/1995 | Dougherty et al. |
| 5,620,209 | A | * | 4/1997 | Sauer ........................ 285/23 |
| 5,749,603 | A | * | 5/1998 | Mann ......................... 285/23 |
| 5,820,166 | A | * | 10/1998 | Webb ......................... 285/23 |
| 5,915,739 | A | * | 6/1999 | Cradduck et al. ............ 285/114 |
| 5,961,157 | A | | 10/1999 | Baron et al. |
| 6,010,162 | A | * | 1/2000 | Grau et al. ................. 285/257 |
| 6,460,897 | B1 | | 10/2002 | Manuli |
| 6,494,233 | B1 | | 12/2002 | Seghi |
| 6,773,037 | B1 | * | 8/2004 | Spurgat ...................... 285/23 |
| 6,824,169 | B1 | * | 11/2004 | Coffman ..................... 285/23 |
| 2004/0222631 | A1 | * | 11/2004 | Baxi et al. .................. 285/252 |

FOREIGN PATENT DOCUMENTS

| | | | | |
|---|---|---|---|---|
| DE | 0045511 | * | 2/1966 | ................. 285/252 |
| DE | 2810589 | | 9/1979 | ................. 285/252 |
| FR | 2630808 | * | 11/1989 | ................. 285/253 |
| GB | 182711 | * | 7/1922 | ................. 285/23 |
| WO | 95/33157 | | 12/1995 | |

OTHER PUBLICATIONS

AEROQUIP Brochure released on Apr. 17, 2000 re Aeroquip introduces E-Z Clip A/C Fitting System—The Most Innovative Fitting System Offered in Over 25 Years.

* cited by examiner

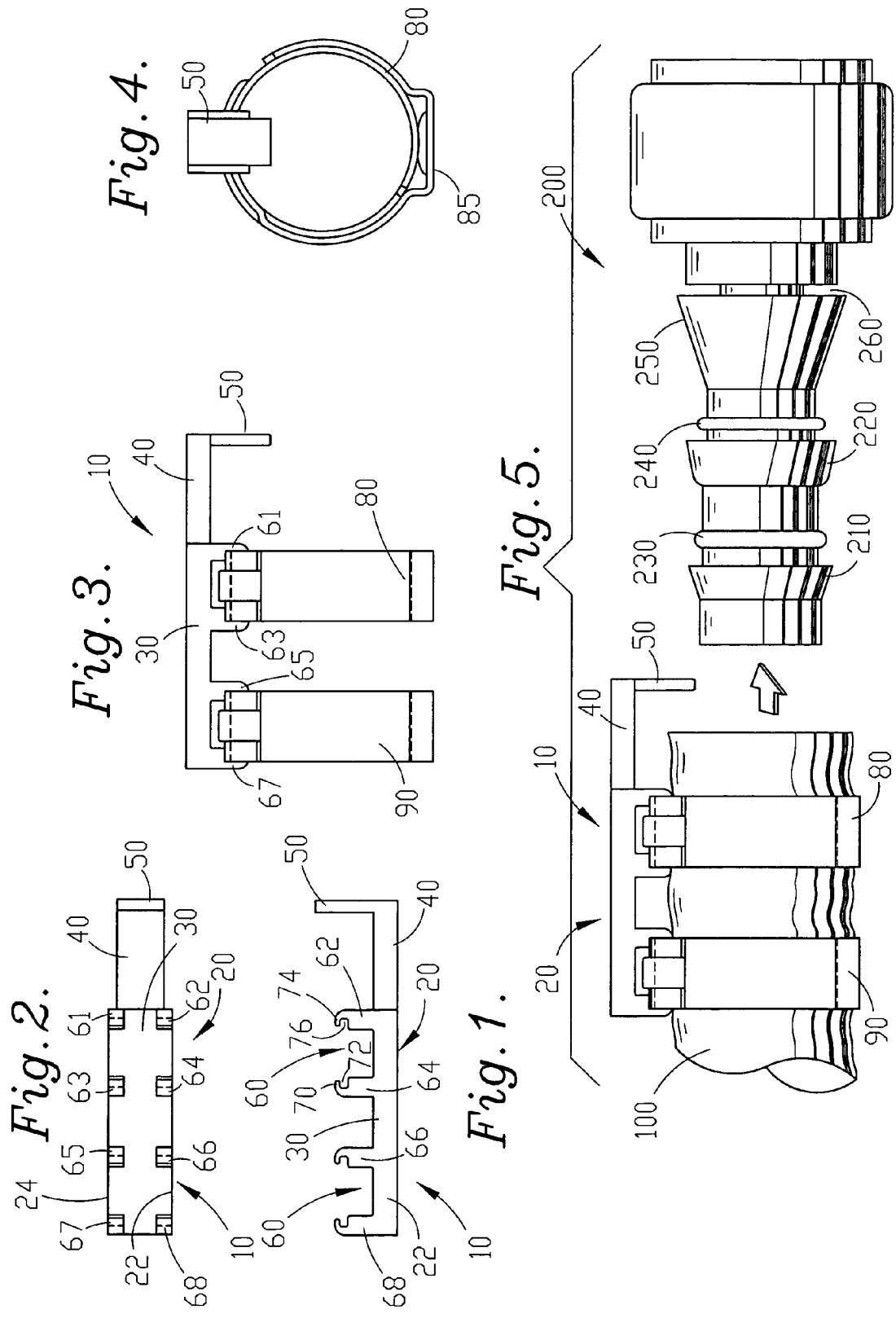

DISPOSABLE CLAMP LOCATOR FOR AIR CONDITIONING HOSE ASSEMBLIES

FIELD OF THE INVENTION

The present invention relates generally to hose assemblies. More specifically, the present invention is concerned with apparatuses and methods for precisely locating clamps in association with a hose fitting of a hose assembly, such as an automotive air conditioner fitting, to provide a leak-free seal between the fitting and a hose when the clamps are crimped over the hose and fitting.

BACKGROUND OF THE INVENTION

In pressurized fluid systems, such as vehicular air conditioning systems, there are often a plurality of sections of flexible hosing. In a single system, these hose sections connect together the various system components such as a compressor, condenser, etc. A coupling member or hose assembly is required at each hose end to allow the hose to be secured to the various components between which the hose extends. The usual manner of securing the flexible hose to the component is to utilize a hose assembly having two concentric cylindrical portions spaced apart from one another by approximately the thickness of the hose. A radial extending flange usually secures the two concentric cylindrical portions to one another. The inner concentric member (fitting or nipple) includes an outer diameter approximately equal to the inside diameter of the hose to which it is being coupled. During assembly, the hose is slipped over the fitting and the outer concentric cylinder (shell or ferrule) is then crimped down upon the hose and the fitting to form a fluid-tight connection. The fitting for the typical hose assembly described usually includes grooves in the outer surface of the fitting to help grip the hose material and improve the seal between the inner surface of the hose and the outer surface of the fitting. With this style of fitting, the shell (ferrule) must be attached to the fitting in order to keep the fitting securely attached to the hose during operation.

Although the crimped ferrule-type hose assemblies described above are quite useful for many factory installed vehicular applications, they are less desirable for applications where hoses must be custom-made and/or installed in the field, such as for buses, off-road vehicles, and in retrofitting existing vehicles with air-conditioning, where the use of the specialty crimping tools needed to crimp the outer ferrule are impractical. For such applications, clamp-type fittings have been designed in which cylindrical bands or clamps are crimped down upon a hose end in which a fitting has been inserted. Examples of such fittings are shown in U.S. Pat. Nos. 6,480,897 and 6,010,162, the entire disclosures of which are incorporated herein by reference. The clamps can easily be crimped using a pliers-type hand tool or alternatively using an air operated crimp tool. The ability to use a pliers-type hand tool makes installation in the field more practical and reduces overall assembly time.

To provide an adequate leak-free seal between the hose and a clamp-type fitting, barbs are formed along the outer surface of the fitting. In addition, o-rings are positioned within grooves formed in the outer surface of the fitting. Clamps are positioned over each o-ring and adjacent to a corresponding barb. Improper positioning of the clamps, such as partially over a barb, or apart from the o-ring, may result in a leak. Therefore, precise location of the clamps in association with the clamp-type fitting is critical. To precisely locate clamps in association with clamp-type fittings, it is common to utilize a clamp locator to which the clamps are attached. A portion of the clamp locator includes an attachment member or other locating surface at one end of the clamp locator that corresponds to a shoulder or other reference point on the fitting or located at the end of the hose. The clamps are attached to the clamp locator at predetermined distances from the locating surface such that the clamps will be located in the desired position along the fitting when the locating surface is placed in contact with the reference point of the fitting.

To ensure a secure connection between the clamp locator and the clamps during assembly of the hose to the fitting, clamp locators of the prior art are either spot welded to the clamps, or the clamps are located within clamp receiving channels formed in traverse plates or clips of the locator body. Such clamp locator configurations result in an integral connection between the clamps and the clamp locator when the clamps are crimped over the hose. Although in some cases, such as in the clamp locator disclosed in U.S. Pat. No. 6,010,162, the clamp locator will operate in conjunction with the clamps to maintain a secure connection between the hose and the fitting, in most applications once the clamps have been located and crimped the clamp locator is no longer necessary. In addition to being unnecessary, the existence of the clamp locator as a part of the installed hose assembly is aesthetically unpleasing and undesirable. Therefore it would be advantageous to provide a hose clamp locator that supports and locates one or more hose clamps during installation and crimping, which is releasable from the hose clamps and disposable upon completion of installation and crimping.

SUMMARY OF THE INVENTION

The present invention comprises a clamp locator in conjunction with clamps to secure a hose, such as an air conditioning hose, to a fitting. The fitting includes a series of raised barbs and may also include o-rings installed in grooves in the outer surface of the fitting. The clamp locator includes a locator body and at least one releasable connection for holding a clamp to the locator body. The locator body includes a traverse plate that extends from the releasable connection to a reference locator portion of the locator body which corresponds to a reference point on a fitting of a hose assembly.

The clamps that are crimped over the hose must be precisely located to achieve a proper leak-free seal between the hose and the fitting. In a preferred embodiment the reference locator comprises a tab member protruding from an end of the traverse plate which corresponds to a reference locator groove on a hose fitting. In yet another preferred embodiment a ramped surface of the fitting leads to the groove. The ramp enables the tab of the locator to slide up to the fitting groove during assembly until the tab "snaps" into the groove. When the tab "snaps" into the groove, the clamps are properly located with respect to the fitting.

In a preferred embodiment, each releasable connection includes at least one pair of legs protruding from the traverse plate. Each pair of legs includes a first leg and a second leg space apart from the first leg approximately the width of the hose clamp. The first leg includes a distal end portion or finger that extends upward from the first leg and curves toward the second leg, creating a void for receiving an edge of a hose clamp. In a similar fashion, the second leg includes a distal end portion or finger that extends upward from the second leg and curves toward the first leg, likewise creating a void for receiving the opposing edge of the hose clamp.

The legs are made of an elastic (such as plastic) material. Once in place, the clamp is crimped and the action of closing over the hose pulls the clamp from the fingers releasing the locator and permitting the locator to be discarded.

In a preferred embodiment, two pairs of legs are utilized to hold a single clamp. A first pair of legs is located at an edge of the traverse plate of the locator body, and a second pair of legs is located at an opposing edge of the traverse plate. Additional pairs of legs can be located along the length of the traverse plate to accommodate multiple hose clamps.

In operation a clamp will be factory-located within the releasable connection of the clamp locator. An installer slides the clamp and locator assembly over the hose, pushing the fitting into the hose so the hose bottoms out on the fitting shoulder and the locator tab "snaps" into the groove on the fitting. The installer then crimps each clamp with special pliers or an air operated crimp tool. In a two clamp assembly, as the second clamp is crimped, the locator pops off and can then be discarded. The end result is the fitting and hose coupled with the clamps in the proper location without the unsightly locator as part of the final hook up.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

FIG. 1 is a side elevation view of the clamp locator of the instant invention.

FIG. 2 is a bottom plan view of the clamp locator of FIG. 1.

FIG. 3 is side elevation view of the clamp locator of FIG. 1 with clamps positioned in the releasable connections of the instant invention.

FIG. 4 is a front elevation view of the clamp locator and clamps shown of FIG. 3.

FIG. 5 is side elevation view of a hose and fitting being assembled using the clamp locator of the instant invention.

DETAILED DESCRIPTION OF A PREFERRED EMBODIMENT

As required, a detailed embodiment of the present inventions is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIGS. 1 and 2 a hose locator of the instant invention is presented. Hose locator 10 includes locator body 20 and releasable connections 60 connected locator body 20. Locator body 20 comprises traverse plate 30 and a reference location member 40 extending from traverse plate 30. Locator tab 50 protrudes from location member 40 in a direction generally orthogonal to location member 40.

Locator 10 of the embodiment depicted in FIGS. 1 and 2 includes two releasable connections 60, for releasably holding two hose clamps. Nevertheless, it will be appreciated that clamp locators can be designed to hold any number of hose clamps without departing from the spirit and scope of the instant invention. Each releasable connection 60 includes two pairs of legs protruding from traverse plate 30 of locator body 20. A first pair of legs, 62 and 64, or 66 and 68, is located on edge 22 of traverse plate 30. A second pair of legs, 61 and 63, or 65 and 67, is located on edge 24 of traverse plate 30, opposite to edge 22.

For purposes of example only connection 60 comprising legs 61, 62, 63 and 64 will now be described in detail; it will be appreciated that connection 60 comprising legs 65, 66, 67 and 68 is constructed in a similar fashion to that described below. Releasable connection 60 includes a first pair of legs 62 and 64 protruding from edge 22 of traverse plate 30, and a second pair of legs 61 and 63 protruding from opposing edge 24 of traverse plate 30. Legs 63 and 64 are spaced apart from legs 61 and 62 respectively to form a gap that is approximately, but less than, the width of a hose clamp that is to be held by connection 60. The end of leg 62 that is distal to traverse plate 30 extends upward and curves inward toward leg 64 to form finger 74 and recess 76. In a similar fashion, the distal end of leg 61 extends upward and curves inward toward leg 63 to form a finger and recess parallel to finger 74 and recess 76 respectively. The end of leg 64 that is distal to traverse plate 30 extends upward and curves inward toward leg 62 to form finger 70 and recess 72. In a similar fashion, the distal end of leg 63 extends upward and curves inward toward leg 61 to form a finger and recess parallel to finger 70 and recess 72 respectively.

As is shown in FIG. 3, recesses 72 and 76, combined with the recesses formed by the fingers extending from legs 61 and 63, hold hose clamp 80 to connection 60. Recesses 72 and 76 create a gap between legs 62 and 64 that is slightly larger than the width of hose clamp 80, permitting hose clamp 80 to be retained between legs 62 and 64. In a similar fashion, the recesses formed in legs 61 and 63 create a gap slightly larger than the width of hose clamp 80, permitting hose clamp 80 to be retained between legs 61 and 63. Clamp 90 is retained between legs 65 and 67 and between legs 66 and 68 in a similar manner as describe above with respect to clamp 80.

Although each releasable connection 60 of the embodiment shown in the instant application and described above includes two pairs of legs to hold each hose clamp, it will be appreciated, that additional pairs of legs can be included to provide additional support for the hose clamp if desired. Alternatively, a single pair of legs can be utilized. Both such variations are intended to be within the scope of the instant invention. In either instance, it may be desirable to vary the width of the legs to provide appropriate support for the hose clamp. For example, in the embodiment comprising a single pair of legs, it may be desirable to increase the width of each leg, and in the embodiment comprising additional pairs of legs, it may be desirable to decrease the width of each leg. Furthermore, alternative embodiments of releasable connection 60 are contemplated as being within the scope of the instant invention. For example a break-away spot weld or other break-away connector could be used as an alternative to the protruding legs and fingers of the depicted embodiment.

FIG. 5 shows clamp locator 10 used in conjunction with clamps 80 and 90 to secure hose 100 to fitting 200. Fitting 200 includes raised barbs 210 and 220 and o-rings 230 and 240. O-rings 230 and 240 are installed in grooves in the outer surface of fitting 200. Fitting 200 further includes ramp portion 250 and annular groove 260 at an upper end of ramp 250.

In operation clamps 80 and 90 are factory-located within releasable connections 60 of clamp locator 10. An installer slides the locator assembly, including clamps 80 and 90 and locator 10 over the end of hose 100 as is shown in FIG. 5. The installer then pushes fitting 200 into the end of hose 100. As the fitting is inserted into hose 100, tab 50 of locator 10 will pass over (without contacting) the top of barbs 210 and 220 and o-rings 230 and 240 and then slide up ramp 230. As it reaches the top end of ramp 230 locator tab 50 then "snaps" down into groove 260. When tab 50 has snapped into groove 260 of fitting 200, clamp 80 will be properly located over seal 240 and between (but not over) both barb 220 and ramp 250. Likewise, clamp 90 will be properly located over seal 230 and between (but not over) both barb 210 and barb 220. The installer then crimps each of clamps 80 and 90 with special pliers or an air operated crimp tool. As is shown in FIG. 4, clamp 80 is crimped by pliers at location 85. As the clamps are crimped over the hose a radial force is created that urges the clamps radially inward toward the center of hose 100. The inward radial force imposed on the clamps bends the elastic fingers inward toward the outer surface of hose 100, and pulls the clamps out of the recesses between the fingers, such that the clamps are released from connection 60. In a two clamp assembly as shown, when the second clamp is crimped, locator 10 pops off or is released from the clamps and the locator can then be discarded or otherwise recycled. The end result is fitting 200 and hose 100 coupled with clamps 80 and 90 in the proper location without unsightly locator 10 as part of the final assembly.

In the preferred embodiment of the instant invention shown and depicted herein, locator 10 is of unitary construction molded of plastic or another elastic material. It will however be appreciated that alternative materials can be utilized without departing from the spirit or scope of the instant invention. In instances where alternative releasable connections are utilized, such as break-away welds, the locator may be manufactured of non-elastic materials. In addition, it would be within the scope of the instant invention to manufacture a locator using releasable connection 60 of the embodiment described here out of a combination of materials, some of which are non-elastic, so long as the fingers of releasable connection 60 have sufficient elastic properties to retain and then release a clamp when the clamp is crimped over a hose. Nevertheless, the preferred embodiment is manufactured of plastic due to the ease and efficiency in manufacturing the clamp locator as a single unit.

As described above, groove 260 of fitting 200 functions as a reference location for association with tab 50 of locator 10. Nevertheless, it will be appreciated that alternative structures can be utilized for both the locator and the reference location without departing from the spirit or scope of the instant invention. For example, an alternative embodiment of the locator could include only the traverse plate (30) without inclusion of tab 50. In such an embodiment, inclusion of groove 260 in fitting 200 would be useless. A more appropriate structure for the reference location in such an embodiment would be a should or other raised surface of the fitting to which the end of traverse plate 30 would abut. Another embodiment of the locator includes an attachment member, similar to those disclosed in U.S. Pat. No. 6,010,162, at the end of traverse plate 30 that fits over a shoulder or other protrusion in the surface of fitting 200 during crimping. The attachment member is then removed from the shoulder once crimping is completed.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A clamp locator for a hose assembly comprising:
a locator body, at least a portion of said locator body corresponding to a reference location of the hose assembly; and
at least one releasable connection for releasably holding a clamp to said locator body, said connection positioned apart from said portion of said locator body corresponding to a reference location of the hose assembly, and said connection comprising:
at least one pair of legs protruding from said locator body; and
a gap between said at least one pair of legs capable of receiving the clamp,
wherein each leg of said at least one pair of legs includes a distal end extending in a direction generally toward the opposing leg of said at least one pair of legs.

2. The clamp locator as claimed in claim 1 wherein said at least one pair of legs comprises a first pair of legs and a second pair of legs positioned apart from said first pair of legs.

3. The clamp locator as claimed in claim 2 wherein said gap is located between said first pair of legs and said second pair of legs.

4. The clamp locator as claimed in claim 2 wherein said gap is located between one of said first pair of legs and said second pair of legs, and an other gap is located between an other of said first pair of legs and said second pair of legs.

5. A method of attaching a clamp on a hose assembly comprising the steps of:
   positioning a clamp assembly including a clamp locator and at least one clamp over a hose;
   inserting a fitting of the hose assembly into the hose;
   locating the clamp locator at a reference point for the hose assembly;
   crimping the at least one clamp about the hose after said locating step; and
   releasing the at least one clamp from the clamp locator as a result of said crimping step.

6. The method as claimed in claim 5 wherein said step of releasing the at least one clamp from the clamp locator comprises the step of pulling the at least one clamp from the clamp locator as a result of said step of crimping the at least one clamp.

7. The method as claimed in claim 5 wherein said steps of crimping and releasing comprise the steps of:
   crimping a first clamp about the hose;
   crimping a second clamp about the hose; and
   releasing the first and second clamps from the clamp locator.

8. The method as claimed in claim 7 wherein said step of releasing the first and second clamps from the clamp locator comprises the steps of:
   pulling the first clamp from the clamp locator as a result of said step of crimping the first clamp; and
   pulling the second clamp from the clamp locator as a result of said step of crimping the second clamp.

9. The method as claimed in claim 5 wherein said step of locating the clamp locator at a reference point for the hose assembly comprises the steps of:
   sliding a tab of the clamp locator up a ramp of the fitting; and
   snapping the tab of the clamp locator into a groove in the fitting.

10. A clamp locator for a hose assembly comprising:
    a locator body, at least a portion of said locator body corresponding to a reference location of the hose assembly; and
    at least one releasable connection for releasably holding a clamp to said locator body, said connection positioned apart from said portion of said locator body corresponding to a reference location of the hose assembly, wherein said releasable connection comprises:
       at least one pair of legs protruding from said locator body; and
       a gap between said at least one pair of legs capable of receiving the clamp;
       and further wherein each leg of said at least one pair of legs includes a distal end extending in a direction generally toward the opposing leg of said at least one pair of legs.

11. A clamp locator for a hose assembly comprising:
    a locator body, at least a portion of said locator body corresponding to a reference location of the hose assembly; and
    at least one releasable connection for releasably holding a clamp to said locator body, said connection positioned apart from said portion of said locator body corresponding to a reference location of the hose assembly, wherein said releasable connection comprises:
       a first pair of legs and a second pair of legs positioned apart from said first pair of legs;
       a first gap between one of said first pair of legs and said second pair of legs, said gap capable of receiving the clamp; and
       a second gap between an other of said first pair of legs and said second pair of legs, and further wherein each leg of said at least one pair of legs includes a distal end extending in a direction generally toward the opposing leg of said at least one pair of legs.

12. A releasable connection for a clamp locator comprising:
    a body member;
    a first leg, said first leg comprising a first pair of spaced-apart members protruding from said body;
    a second leg, said second leg comprising a second pair of spaced-apart members protruding from said body; and
    a gap between said first leg and said second leg, said gap adapted to receive a clamp, wherein said first leg includes an end portion extending generally toward said second leg and said second leg portion includes an end portion extending generally toward said first leg.

13. A releasable connection for a clamp locator comprising:
    a body member;
    a first leg protruding from said body member;
    a second leg, protruding from said body member;
    a gap between said first leg and said second leg, said gap adapted to receive a clamp;
    a third leg spaced apart from said first and second legs;
    a fourth leg spaced apart from said first, second, and third legs; and
    a second gap located between said third and fourth legs, said second gap adapted to receive a second clamp,
    wherein said first leg includes an end portion extending generally toward said second leg and said second leg portion includes an end portion extending generally toward said first leg.

14. A releasable connection for a clamp locator comprising:
    a body member;
    a first leg protruding from said body member;
    a second leg, protruding from said body member;
    a gap between said first leg and said second leg, said gap adapted to receive a clamp;
    a third leg spaced apart from said first and second legs;
    a fourth leg spaced apart from said first, second, and third legs; and
    a second gap located between said third and fourth legs, said second gap adapted to receive a second clamp,
    wherein said first leg includes an end portion extending generally toward said second leg and said second leg portion includes an end portion extending generally toward said first leg, and further wherein said third leg comprises a pair of spaced-apart members protruding from said body, and said fourth leg comprises an other pair of spaced-apart members protruding from said body.

15. A method of attaching a clamp on a hose assembly comprising the steps of:
    positioning a clamp assembly including a clamp locator and at least one clamp over a hose;
    inserting a fitting of the hose assembly into the hose;
    locating the clamp locator at a reference point for the hose assembly;
    crimping the at least one clamp about the hose after said locating step; and
    releasing the at least one clamp from the clamp locator of said crimping step,
    wherein the step of releasing the at least one clamp from the clamp locator comprises the step of pulling the at least one clamp from the clamp locator as a result of said step of crimping the at least one clamp.

16. A method of attaching a clamp on a hose assembly comprising the steps of:
    positioning a clamp assembly including a clamp locator and at least one clamp over a hose;
    inserting a fitting of the hose assembly into the hose;
    locating the clamp locator at a reference point for the hose assembly;
    crimping the at least one clamp about the hose after said locating step; and
    releasing the at least one clamp from the clamp locator of said crimping step,
    wherein the steps of crimping and releasing comprise the steps of:
      crimping a first clamp about the hose;
      crimping a second clamp about the hose; and
      releasing the first and second clamps from the clamp locator.

17. A method of attaching a clamp on a hose assembly comprising the steps of:
    positioning a clamp assembly including a clamp locator and at least one clamp over a hose;
    inserting a fitting of the hose assembly into the hose;
    locating the clamp locator at a reference point for the hose assembly;
    crimping the at least one clamp about the hose after said locating step; and
    releasing the at least one clamp from the clamp locator of said crimping step,
    wherein said step of releasing the first and second clamps from the clamp locator comprises the steps of:
      pulling the first clamp from the clamp locator as a result of said step of crimping the first clamp; and
      pulling the second clamp from the clamp locator as a result of said step of crimping the second clamp.

18. A method of attaching a clamp on a hose assembly comprising the steps of:
    positioning a clamp assembly including a clamp locator and at least one clamp over a hose;
    inserting a fitting of the hose assembly into the hose;
    locating the clamp locator at a reference point for the hose assembly;
    crimping the at least one clamp about the hose after said locating step; and
    releasing the at least one clamp from the clamp locator of said crimping step,
    wherein the step of locating the clamp locator at a reference point for the hose assembly comprises the steps of:
      sliding a tab of the clamp locator up a ramp of the fitting; and
      snapping the tab of the clamp locator into a groove in the fitting.

19. A hose assembly comprising:
    a clamp locator, said clamp locator including a traverse plate, a clamp connection, and a locating tab generally orthogonally protruding from said traverse plate;
    a fitting including a groove for receiving said locating tab,
    wherein said clamp connection comprises a releasable connection, and further wherein said releasable connection comprises:
      at least one pair of legs protruding from said traverse plate; and
      a gap between said at least one pair of legs capable of receiving said clamp;
    wherein each leg of said at least one pair of legs includes a distal end extending in a direction generally toward the opposing leg of said at least one pair of legs.

20. A clamp locator for a hose assembly comprising:
    a locator body, at least a portion of said locator body corresponding to a reference location of the hose assembly; and
    at least one releasable connection for releasably holding a clamp to said locator body, said connection positioned apart from said portion of said locator body corresponding to a reference location of the hose assembly,
    wherein said releasable connection comprises:
      at least one pair of legs protruding from said locator body; and
      a gap between said at least one pair of legs capable of receiving the clamp;
    and further wherein each leg of said at least one pair of legs includes a distal end extending in a direction generally toward the opposing leg of said at least one pair of legs, and still further wherein said at least one pair of legs comprises a first pair of legs and a second pair of legs positioned apart from said first pair of legs.

21. A clamp locator for a hose assembly comprising:
    a locator body, at least a portion of said locator body corresponding to a reference location of the hose assembly; and
    at least one releasable connection for releasably holding a clamp to said locator body, said connection positioned apart from said portion of said locator body corresponding to a reference location of the hose assembly,
    wherein said releasable connection comprises:
      at least one pair of legs protruding from said locator body; and
      a gap between said at least one pair of legs capable of receiving the clamp;
    and further wherein each leg of said at least one pair of legs includes a distal end extending in a direction generally toward the opposing leg of said at least one pair of legs, and still further wherein said at least one pair of legs comprises a first pair of legs and a second pair of legs positioned apart from said first pair of legs and said gap is located between said first pair of legs and said second pair of legs.

22. A hose assembly comprising:
    a clamp locator, said clamp locator including a traverse plate, a clamp connection, and a locating tab generally orthogonally protruding from said traverse plate; and
    a fitting including a groove for receiving said locating tab,
    wherein said fitting further comprises a ramp leading to said grove,
    wherein said clamp connection comprises a releasable connection, wherein said releasable connection comprises:
  at least one pair of legs protruding from said traverse plate; and
  a gap between said at least one pair of legs capable of receiving said clamp;

wherein each leg of said at least one pair of legs includes a distal end extending in a direction generally toward the opposing leg of said at least one pair of legs.

* * * * *